Sept. 26, 1944.  C. S. KNIGHT  2,358,932
METHOD OF FORMING FILTER MEDIUMS
Filed Aug. 2, 1939  2 Sheets-Sheet 1
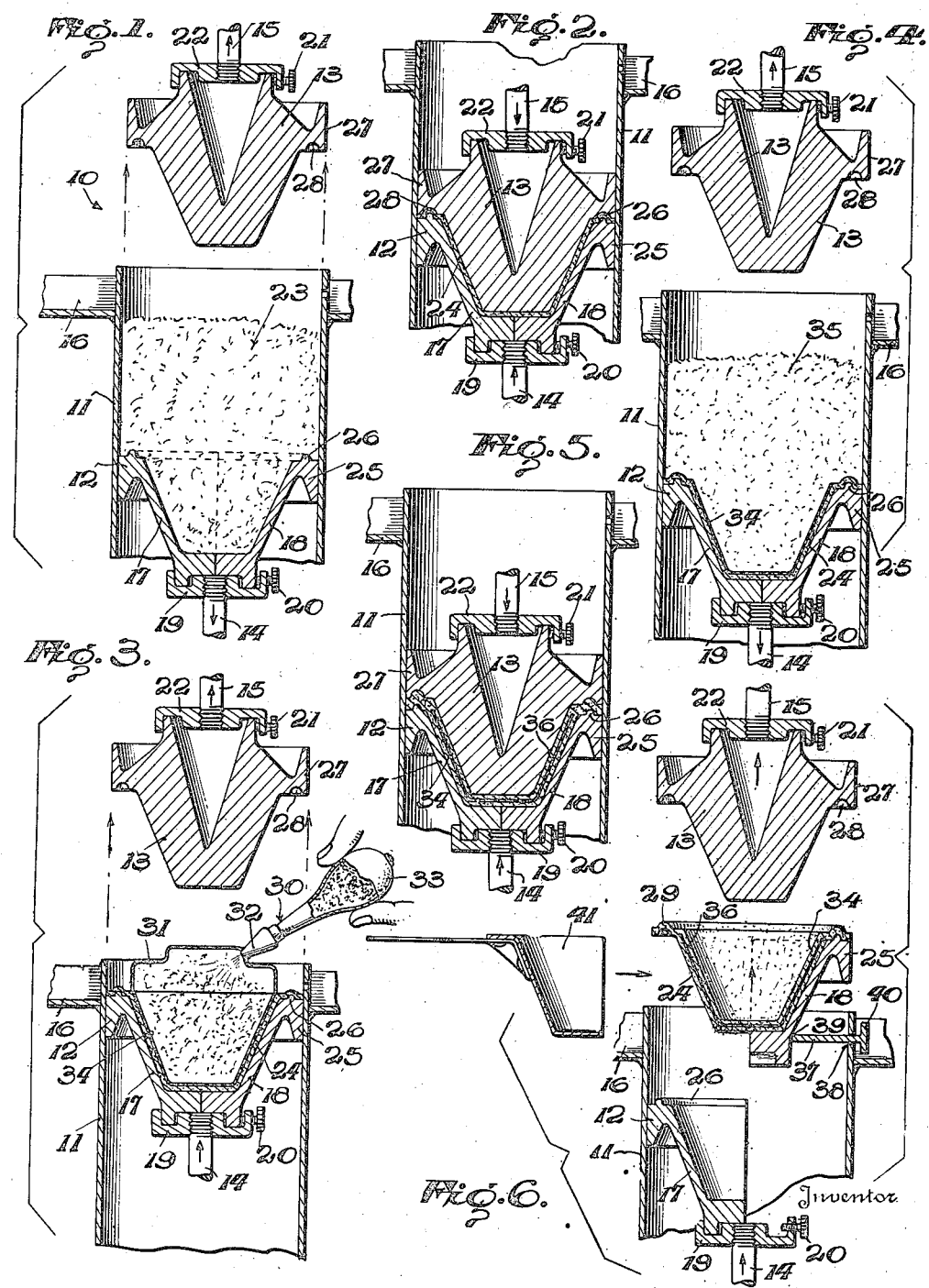
Inventor
Charlotte S. Knight.
By Cushman, Darby & Cushman
Attorneys

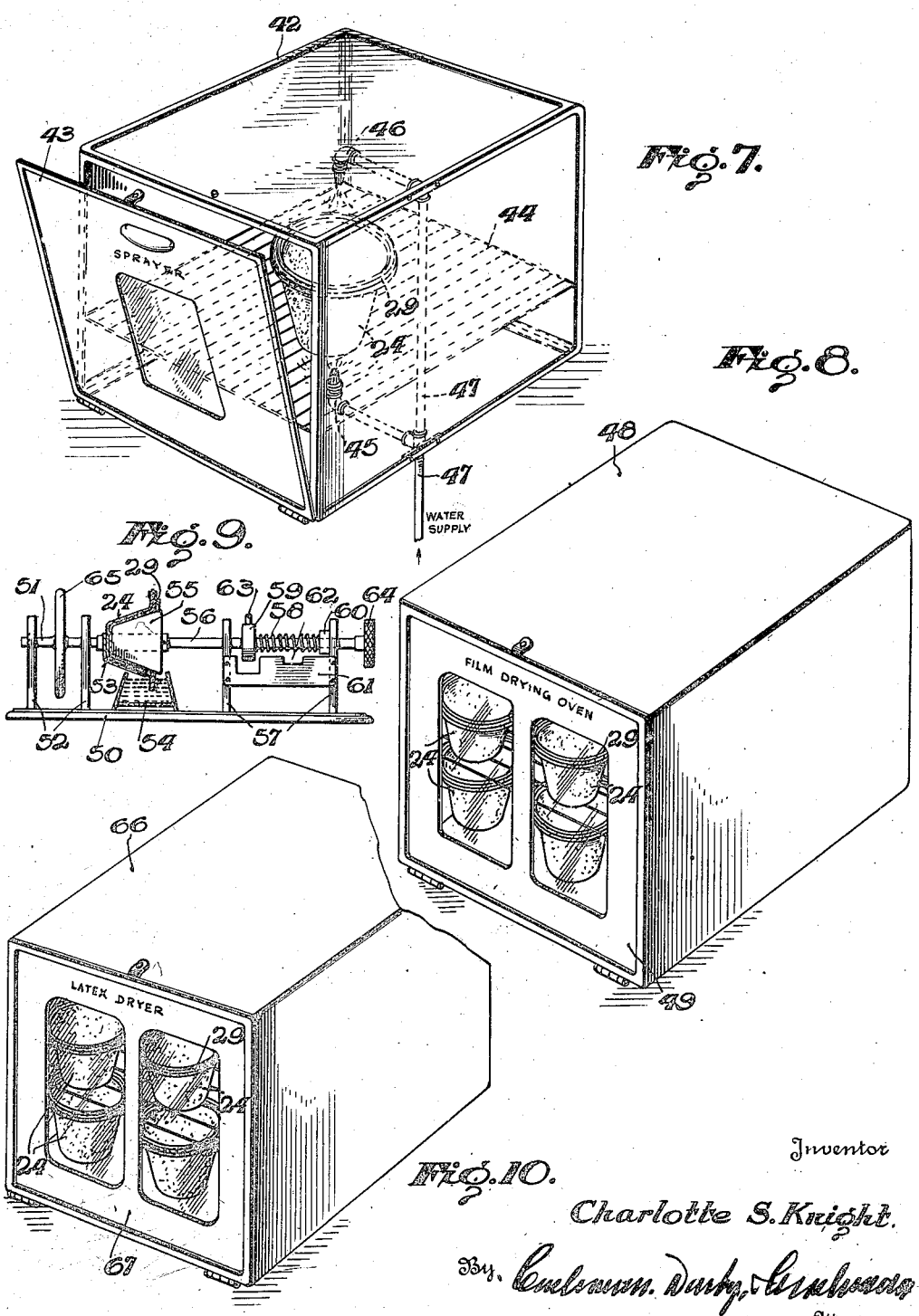

Patented Sept. 26, 1944

2,358,932

UNITED STATES PATENT OFFICE 2,358,932

METHOD OF FORMING FILTER MEDIUMS

Charlotte S. Knight, New York, N. Y.

Application August 2, 1939, Serial No. 288,026

2 Claims. (Cl. 18—55)

The present invention relates to a method of forming filter mediums or films and constitutes an improvement upon the method disclosed in my Patent No. 2,146,749, February 14, 1939. The patent covers a wet method of forming filters and while it has proven to be quite efficient it has certain disadvantages which are eliminated by the method of the present application.

The present method differentiates principally from the patented method in that it is a dry method, that is, I utilize loose, dry asbestos fibres, which are introduced into a dry mold. The molding surfaces of this mold are imperforate, smooth and maintained in a dry condition during the molding operation.

I have found that filter mediums or films formed by this dry method are better than those made by the wet method in that they can be made more uniform and consistent. Furthermore, these dry method filters can be made less dense than those formed by the wet method and will therefore filter a greater volume of water.

The present invention provides a more practical method of manufacture in that electric mixers or agitators are not needed and large water tanks used in the wet method can be eliminated.

Another advantage of the dry method is that it is faster and more economical in that less time is required to finish the films after the molding operation. For instance, since the films are molded dry and are moistened only after the molding operation, less time is required to dry and condition the filters in the drying ovens.

With the foregoing and other objects in view, the invention will now be more particularly described, reference being had to the accompanying drawings, in which:

Figure 1 is a sectional view of the mold sections separated prior to forming the first layer.

Figure 2 is a sectional view showing the mold sections in closed molding position.

Figure 3 is a sectional view showing the mold sections separated and the carbon applying implement in operative position on the lower mold.

Figure 4 is a sectional view showing the mold sections separated preliminary to forming the second layer.

Figure 5 is a sectional view similar to Figure 2 showing the mold sections in closed molding position.

Figure 6 is a sectional view showing the mold sections separated and the molded filter medium supported upon one half of the lower mold section.

Figure 7 is a perspective view of the filter medium spraying mechanism.

Figure 8 is a perspective view of the film drying oven.

Figure 9 is an elevational view partly in section of the latex coating machine, and Figure 10 is a perspective view of the latex drier.

Referring now to the drawings and particularly to Figure 1, there is disclosed a molding apparatus 10 comprising a substantially vertically disposed tube or cylinder 11 within which a pair of mold sections 12 and 13 are designed to operate during the molding operation. The section 12 is a lower or female mold, while the section 13 is an upper or male mold. The molding surfaces of these mold sections are shown as being conical in formation but it is to be understood that they may be of any other desired configuration. The molding surfaces are smooth and imperforate and during the molding operation are adapted to be maintained in a substantially dry condition.

The mold sections may be raised and lowered by any desired operating mechanism and in the present instance, rods or shafts 14 and 15 are shown secured to the lower and upper sections, respectively. These shafts may be connected to any suitable manually or automatically controlled mechanism which will operate to raise and lower the mold sections as desired during the forming of the filter medium or film. The upper portion of the tube or cylinder 11 is shown connected to a table top or other flat surface 16 which is conveniently disposed with respect to the operator. The lower mold section 12 is split to provide identical halves 17 and 18 which rest upon a plate 19 supported upon the rod 14. A set screw 20 is employed to clamp the mold sections to the plate 19. A second set screw 21 may be employed to clamp the upper mold section 13 to a plate 22 carried by shaft 15, although any other desired means may be utilized.

With the mold sections disposed as shown in Figure 1, a measured amount of dry asbestos fibres 23 is introduced into the cylinder 11. This may be done by hand or any desired means may be employed for automatically dropping the fibres into the cylinder. In this view, the lower mold section 12 is positioned adjacent the bottom of the cylinder and the charge of dry asbestos fibres 23 substantially fills the rest of the cylinder.

It is to be observed that the interior wall of the cylinder and the molding surfaces of the mold sections are perfectly dry and in turn operate upon a quantity of loose dry asbestos fibres. With the fibres and mold sections in this condition, the mold sections are moved toward each other to the position shown in Figure 2 at the center of the cylinder so as to compress the fibres and form a film or layer of filter medium 24. It will be observed that the marginal portion 25 of the lower mold section is provided with an annular rib 26 while the marginal portion 27 of the upper mold section is provided with a complementary annular groove 28. The reason for employing a rib and groove arrangement in the mold sections is to provide the finished filter medium with an annular rib and groove configuration 29 which will cooperate with the rib and groove structure of a sectional filter casing such as shown in my Patent No. 2,042,106, May 26, 1936. After the layer 24 has been formed, the mold sections are raised and then separated to the position shown in Figure 3, that is, with the lower mold section 12 at the top of the cylinder 11 and the upper mold section 13 raised to a position entirely out of the cylinder.

The next step in the method is to apply a coating of carbon to the conical inner surface of the layer 24, leaving the ribbed marginal portion 29 of the layer uncoated. This is accomplished by employing a coating implement 30 comprising a cover-like element 31 of a size to engage the upper extremity of the conical portion of the layer 24 and form with the layer a closed receptacle. Secured to the cover 31 is a nozzle 32 which in turn is connected to a flexible or rubber bulb 33. This bulb is preferably filled with dry carbon. A slight pressure on the bulb will cause it to blow a cloud of carbon onto the conical covered inner portion of the layer. This forms a layer 34 of carbon on the layer of asbestos, leaving the marginal portion or flange 29 of the latter uncoated.

After the coating of carbon has been applied to the layer 24, the lower mold section 12 with the layer 24 is then lowered in the cylinder 11, as shown in Figure 4. It will be observed that the lower mold section is now in substantially the same position shown in Figure 1, that is, in position to receive another charge 35 of dry asbestos fibres. After this second charge has been placed in the cylinder on top of the coating 34 of carbon, the mold sections are moved toward each other in the cylinder into operative molding position as shown in Figure 5. This operation forms a second layer of asbestos 36 upon the carbon coating 34. As will be observed (see Figures 5 and 6) the molded filter medium now comprises compressed layers 24 and 36 of dry asbestos fibres, with a layer of dry carbon coating 34 sandwiched between the asbestos layers. Since the carbon coating only extends to the top of the conical portion of the filter medium, the layers 24 and 36 merge into a single homogeneous marginal ribbed portion which entirely conceals and encloses the inner layer of carbon 36.

Since the filter medium thus far formed is composed of dry asbestos fibres and dry carbon, it is necessary to exercise care in removing it from the mold to prevent crushing or breaking the film. For this reason the lower mold section is divided into the halves 17 and 18 in order that one mold section, such as 18, may be raised relative to the other mold section 17 out of the cylinder 11 and carry with it the molded film, as clearly shown in Figure 6. Any suitable means may be provided or employed for separating the halves 17 and 18. For instance, the lower mold section may be lifted out of the cylinder 11 to permit the set screw 20 to be unscrewed and then the half 18 grasped by hand to maintain it in the position shown in Figure 6, while the other half 17 is lowered within the cylinder.

However, I prefer to employ a tool 37 which is slidable in a slot 38 located in the upper portion of the cylinder above the table 16. This tool consists of a flat body having a curved mold engaging inner edge 39 adapted to normally lie flush with the inner wall of the cylinder during the molding operations. A knob or handle 40 is secured to the outer end of the tool exteriorly of the cylinder. In use, the lower mold section is elevated to the top of the cylinder and the operator loosens the set screw 20. Of course, if desired the set screw may be eliminated and any other means employed to secure the lower mold section to the plate 19. After the mold section is raised, the operator slides the tool 37 inwardly so that the curved edge 39 engages and supports the lower portion of the half 18. Thereafter the half 17 is lowered to the position shown in Fig. 6. The edge 39 is designed to contact the half 18 directly below the conical or inclined wall of the mold section. If desired, any means such as a recess or lug may be formed in or on the half 18 to cooperate with the tool in maintaining the half in its raised position.

After the half 18 has been moved to the position shown in Figure 6 with the filter medium supported thereon, a holder or scoop 41 is employed to engage the free unsupported half of the film. This holder is of substantially semi-conical formation. That is, it is of a shape to adequately support and lift the filter medium from the half 18 of the section 12.

The next step is to harden the filter medium so that it may be readily handled and used without breakage and this is accomplished by placing the film in a spraying cabinet 42 (see Figure 7). This cabinet may be of any desired construction but as shown in Figure 7 is preferably square and provided with a hinged lid 43. Within the cabinet is mounted an open wire tray 44 upon which the filter medium is adapted to be supported in upright position. A lower spray nozzle 45 is supported below the tray while an upper spray nozzle 46 is positioned above the tray in line with the lower nozzle 45. These nozzles are connected through suitable piping 47 to a water supply. Each filter medium is adapted to be placed on the tray in vertical alignment with the upper and lower nozzles 45 and 46 and then water or other suitable liquid is sprayed upon the exterior and interior of the film until it has been completely moistened.

After the spraying operation, the holder 41 is then utilized to transfer the moistened filter medium to a drying oven 48 shown in Figure 8. This oven may be of any suitable construction and is provided with a hinged door 49 through which the filter medium or film may be introduced into the oven. As shown, the oven is capable of receiving a plurality of filter mediums. Any suitable means may be employed to dry the filter mediums.

When the films are removed from the oven 48 they are considerably strengthened and in condition to be manually handled, although if desired, the holder 41 may be employed to remove the films and transfer them to a machine for performing the next step in the method.

As has been previously mentioned these filter mediums are adapted to be used in sectional filter casings having cooperating rib and groove elements such as illustrated in my Patent 2,042,106. In order to provide an efficient seal between the filter medium and the filter casing I coat the marginal portion or flange 29 of the filter medium with a solution of latex. This is accomplished by providing a machine in which the latex coating may be quickly and evenly applied to the flange or marginal portion 29 of the filter medium.

This machine is disclosed in Figure 9 and comprises a base 50 upon which is rotatably mounted a shaft 51 journalled in uprights 52. To the inner end of this shaft is secured a film receiving member 53 consisting of a substantially half cup or semi-conical device conforming to the shape of the molded filter medium. A trough or latex containing receptacle 54 is supported on the base 50 in position whereby the outer end or marginal portion of the member 53 may rotate within the trough and thereby submerge the flange 29 of the filter medium in the bath of latex. In positioning a filter medium in coating position it is desired that the member 53 be positioned as shown in Figure 9, that is, so that the film or filter medium may be dropped down or placed upon the member 53 from above and without jamming the same. After the film has been placed on the member 53, a plunger or head 55 is pressed into the interior of the film so as to clamp the same to the member 53. This plunger is secured to one end of a rod or shaft 56 which is rotatably and slidably mounted in uprights 57. A coil spring 58 surrounds the shaft 56 between the uprights 57 and is secured at one end to a collar 59 fixed to the shaft 56. The other end of the coil spring is connected to a second collar 60 which is loosely mounted on the shaft 56.

With this arrangement, the coil spring 58 will normally urge the plunger 55 into operative film clamping position. A plate 61 is supported between the uprights 57 and is provided with a notched portion 62 adjacent its outer end. This is to receive a lug 63 projecting outwardly from the collar 59 and thereby maintain the head or plunger 55 in inoperative position out of contact with the member 53. In this position the coil spring will be compressed.

A handle 64 is secured to the outer end of the shaft 56 to permit an operator to move the plunger into and out of operative position. As will also be observed a hand wheel 65 is mounted on the rod 51 between the uprights and is adapted to be slowly rotated by hand after a filter medium has been clamped in operative position in the member 53. Rotation of the hand wheel 65 will rotate the rod 51 and with it the member 53, plunger 55, and shaft 56. Since the lower portion of the flange 29 is submerged in the bath of latex in the trough 54, rotation of the member 53 will gradually apply a coating of latex to both surfaces of the marginal portion or flange 29 of the film.

After the coating of latex has been applied to the filter medium, the handle 64 is operated to withdraw the plunger 55 from the medium and the latter may then be removed from the member 53. Thereafter, the film is placed together with other filter mediums, in a drying oven 66. This oven may be similar to the oven 48 except that hot air is adapted to be circulated through the oven 66 whereas any suitable means may be employed to dry the films in the oven 48. The oven 66 is provided with a hinged cover 67 similar to the cover 49 of oven 48.

When the filter mediums or films are removed from the oven 66, they are completely dry and are then ready for immediate use or shipment. As mentioned aforesaid, these filter mediums are preferably formed with the rib and groove formation in the clamping flange or marginal portion so that they may be used in connection with filter casings having like formations such as shown in my Patent 2,042,106. It is to be understood, however, that the films may be molded without the formation, if desired. It is also to be understood that the term "cylinder" as used in the claims is to be interpreted as including a tubular member of any desired cross section within which the mold sections operate. It is to be further understood that the method described is merely illustrative of a preferred embodiment and that such changes may be made as fall within the purview of one skilled in the art without departing from the spirit of the invention and the scope of the appended claims.

I claim:

1. The method of forming a layer of filter medium which includes employing a cylinder and cooperating mold sections movable in said cylinder and having smooth, dry imperforate molding surfaces, placing one mold section within the cylinder, introducing a quantity of dry asbestos fibers into the cylinder upon the said last-mentioned mold section, moving the mold sections into operative molding position within and relative to the cylinder to form the filter layer, removing the dry filter layer from the cylinder, moistening the filter layer, and then drying the filter layer.

2. The method of forming a cup-shaped layer of filter medium which includes employing a vertically disposed cylinder and cooperating upper and lower mold sections having smooth, dry, cup-shaped molding surfaces, the lower mold section being vertically split to form two separable portions, positioning the lower mold section adjacent the bottom of the cylinder, introducing a quantity of dry asbestos fibers into the top of the cylinder upon the lower mold section so as to substantially fill the cylinder, moving the upper mold section into the top of the cylinder upon and into operative molding position with the lower mold section to form the filter layer, removing the upper mold section from the cylinder, raising the lower mold section with the layer out of the cylinder, and then detaching one of the portions of the lower mold section from the other portion to expose a portion of the outer surface of the layer and thereby facilitate removal of the layer from the mold.

CHARLOTTE S. KNIGHT.